(12) United States Patent
Wang et al.

(10) Patent No.: US 11,929,706 B1
(45) Date of Patent: Mar. 12, 2024

(54) SOLAR PHOTOVOLTAIC PANEL ASSEMBLY AND VEHICLE INCLUDING SOLAR PHOTOVOLTAIC PANEL ASSEMBLY

(71) Applicant: XIAMEN DONESTY ECOMMERCE CO., LTD., Fujian (CN)

(72) Inventors: Hao Wang, Fujian (CN); Haojun Hong, Fujian (CN); Jingshan Wei, Fujian (CN)

(73) Assignee: XIAMEN DONESTY ECOMMERCE CO., LTD., Fujian (CN)

( * ) Notice: Subject to any disclaimer, the term of this patent is extended or adjusted under 35 U.S.C. 154(b) by 0 days.

(21) Appl. No.: 18/185,337

(22) Filed: Mar. 16, 2023

(30) Foreign Application Priority Data

Feb. 1, 2023 (CN) .......................... 202320148422.8

(51) Int. Cl.
*H02S 20/30* (2014.01)
*H02S 30/10* (2014.01)

(52) U.S. Cl.
CPC .............. *H02S 20/30* (2014.12); *H02S 30/10* (2014.12)

(58) Field of Classification Search
CPC ................................ H02S 30/20; H02S 10/40
See application file for complete search history.

(56) References Cited

U.S. PATENT DOCUMENTS

| | | | | |
|---|---|---|---|---|
| 2005/0161073 A1* | 7/2005 | Head | ....................... | H02S 10/40 136/245 |
| 2010/0000592 A1* | 1/2010 | Ko | ......................... | H02S 20/00 136/246 |
| 2017/0025990 A1* | 1/2017 | Mastrogiannis | ........ | F24S 25/65 |
| 2017/0222475 A1* | 8/2017 | Van Straten | ............ | H02S 10/40 |
| 2019/0270528 A1* | 9/2019 | Lawhon | .................. | B64G 1/443 |
| 2019/0326846 A1* | 10/2019 | Ansari | ..................... | C02F 1/006 |

FOREIGN PATENT DOCUMENTS

| | | | | |
|---|---|---|---|---|
| CN | 107994842 A | * | 5/2018 | ............. H02S 10/40 |
| KR | 20110001892 U | * | 2/2011 | |
| WO | WO-2013061354 A2 | * | 5/2013 | ............. H02S 10/40 |

OTHER PUBLICATIONS

Machine translation of KR202011-0001892U (Year: 2011).*
Machine translation of CN10794842A (Year: 2018).*

* cited by examiner

Primary Examiner — Ryan S Cannon (57) ABSTRACT

Provided are a solar photovoltaic panel assembly and a vehicle including the solar photovoltaic panel assembly. The solar photovoltaic panel assembly includes: a support frame having a primary photovoltaic panel mounting layer and a secondary photovoltaic panel sliding layer that are laminated to each other; a primary photovoltaic panel mounted on the primary photovoltaic panel mounting layer; a secondary photovoltaic panel; and a driving member. The secondary photovoltaic panel is slidably movable along the secondary photovoltaic panel sliding layer to a storage position at which the secondary photovoltaic panel has a maximum overlapping area with the primary photovoltaic panel and an expansion position at which the secondary photovoltaic panel slidably moves outwards relative to the primary photovoltaic panel. The driving member is mounted on the support frame and configured to drive the secondary photovoltaic panel to slidably move along the secondary photovoltaic panel sliding layer.

20 Claims, 8 Drawing Sheets

SOLAR PHOTOVOLTAIC PANEL ASSEMBLY AND VEHICLE INCLUDING SOLAR PHOTOVOLTAIC PANEL ASSEMBLY

CROSS-REFERENCE TO RELATED APPLICATIONS

This application is based on and claims priority to Chinese Patent Application No. 202320148422.8, filed on Feb. 1, 2023, the entire content of which is incorporated herein by reference.

FIELD

The present disclosure relates to the field of solar power generation, and more particularly, to a solar photovoltaic panel assembly and a vehicle including the solar photovoltaic panel assembly.

BACKGROUND

Currently, recreational vehicle market is prosperous, and a power source of electrical equipment such as an electronic device, a television, a refrigerator, an air conditioner, or a water pumping device in a recreational vehicle is mainly from gasoline power generation of the recreational vehicle, urban electricity access, and solar photovoltaic panels. The gasoline power generation is significantly uneconomical, and the urban electricity access is easily limited in a remote region. However, for the power generation of the solar photovoltaic panel, a storage battery can be charged as long as there is sunlight.

Due to convenience of the solar photovoltaic panel to generate power, it is more likely to generate power by the solar photovoltaic panel during travel. In addition, a roof of the recreational vehicle has a confined space. Therefore, a mounting area is restricted by traditional arrangement of a solar panel, which results in a limited generated output and is difficult to satisfy user's power demand.

SUMMARY

The present disclosure aims to at least solve one of the technical problems in the related art to some extent. To this end, the present disclosure provides a solar photovoltaic panel assembly, which can enlarge a power generation area.

The present disclosure further provides a vehicle including the solar photovoltaic panel assembly, for example, a recreational vehicle.

According to embodiments of an aspect of the present disclosure, the solar photovoltaic panel assembly includes a support frame, a primary photovoltaic panel, a secondary photovoltaic panel, and a driving member. The support frame has a primary photovoltaic panel sliding layer and a secondary photovoltaic panel sliding layer that are laminated to each other in a thickness direction of the support frame. The primary photovoltaic panel is mounted on the primary photovoltaic panel mounting layer. The secondary photovoltaic panel is slidably movable along the secondary photovoltaic panel sliding layer to a storage position at which the secondary photovoltaic panel has a maximum overlapping area with the primary photovoltaic panel in the thickness direction of the support frame and an expansion position at which the secondary photovoltaic panel slidably moves outwards relative to the primary photovoltaic panel. The driving member is mounted on the support frame and configured to drive the secondary photovoltaic panel to slidably move along the secondary photovoltaic panel sliding layer.

With the solar photovoltaic panel assembly according to the embodiments of the present disclosure, the secondary photovoltaic panel slidably moves outwards to the expansion position relative to the primary photovoltaic panel. Therefore, it is possible to increase a power generation area of the solar photovoltaic panel assembly, thereby increasing a power generation amount to satisfy user's requirements for power utilization.

According to some embodiments of the present disclosure, the support frame is constructed as a frame structure penetrated in a thickness direction.

According to some embodiments of the present disclosure, one secondary photovoltaic panel sliding layer is provided and located on a side of the primary photovoltaic panel mounting layer facing towards a vehicle body of a vehicle.

According to some embodiments of the present disclosure, the driving member is in a form of an electrical retractable rod and includes a driving element and a retractable rod. The driving element includes a base hinged to the support frame. The retractable rod has one end located in the driving element and another end hinged to the secondary photovoltaic panel. The driving element is configured to drive the retractable rod to extend or retract relative to the driving element.

According to some embodiments of the present disclosure, a base bracket is disposed on the support frame, and the base is hinged to the base bracket by a base hinge pin. A rod support is disposed on the secondary photovoltaic panel, and the retractable rod is hinged to the rod support by a rod hinge pin.

According to some embodiments of the present disclosure, the driving member is of a rod-shaped structure, and a length extending direction of the driving member intersects with or is parallel to a sliding-out direction of the secondary photovoltaic panel.

According to some embodiments of the present disclosure, an angle between the length extending direction of the driving member and the sliding-out direction of the secondary photovoltaic panel ranges from 30° to 60°.

According to some embodiments of the present disclosure, the driving member further include a first limiting switch and a second limiting switch. The first limiting switch is configured to limit an ultimate extending position of the retractable rod extending from the driving element. The second limiting switch is configured to limit an ultimate retraction position of the retractable rod retracting towards the driving element.

According to some embodiments of the present disclosure, the driving member further includes a control unit. The control unit is a remote-control unit and is configured to drive the retractable rod to extend or retract.

According to some embodiments of the present disclosure, the primary photovoltaic panel mounting layer includes a lower bracket and an upper pressing member. The lower bracket has a lower supporting surface. The upper pressing member has an upper pressing surface. The lower supporting surface is located on a side of the upper pressing surface facing towards a vehicle body of a vehicle. A primary photovoltaic panel mounting space is defined between the lower supporting surface and the upper pressing surface. A bottom surface of the primary photovoltaic panel is supported by the lower supporting surface. The upper pressing surface is pressed against a top surface of the primary photovoltaic panel.

According to some embodiments of the present disclosure, sliding rails are disposed on the secondary photovoltaic panel sliding layer and arranged opposite to each other. The secondary photovoltaic panel is configured to be slidably engaged with the sliding rails.

According to some embodiments of the present disclosure, the support frame is a rectangular frame and includes short side frames opposite to each other and long side frames connected to the short side frames. A length of each of the short side frames is smaller than a length of each of the long side frames, and the sliding rails are arranged on the short side frames opposite to each other, respectively.

According to some embodiments of the present disclosure, a vehicle body connection portion is disposed on the support frame and configured to be connected to a vehicle body of a vehicle.

According to some embodiments of the present disclosure, the vehicle body connection portion is of a form of a fixed wing, and includes a first wing plate and a second wing plate. The first wing plate is fixed on the support frame. The second wing plate is connected to the first wing plate. The second wing plate and the vehicle body of the vehicle are connected to each other through bonding and/or by means of a fastener.

According to some embodiments of the present disclosure, the primary photovoltaic panel and the secondary photovoltaic panel have a same structure and each include a photovoltaic panel frame and a photovoltaic panel body. The photovoltaic panel frame is constructed as a frame-type structure circumferentially closed and penetrated in a thickness direction, and the photovoltaic panel body is mounted within a space circumferentially enclosed by the photovoltaic panel frame.

According to some embodiments of the present disclosure, the support frame is an aluminum profile frame. The photovoltaic panel frame is an aluminum alloy frame. The vehicle body connection portion is an aluminum alloy wing.

According to some embodiments of the present disclosure, the solar photovoltaic panel assembly further includes a controller and an energy storage battery. The controller is adapted to be connected to the primary photovoltaic panel and the secondary photovoltaic panel. The energy storage battery is connected to the controller. The controller is configured to convert solar energy from the primary photovoltaic panel and/or the secondary photovoltaic panel into electric energy and store the electric energy in the energy storage battery.

According to embodiments of another aspect of the present disclosure, a vehicle is provided. The vehicle includes a vehicle body and the solar photovoltaic panel assembly as described above. The solar photovoltaic panel assembly is located on a roof of the vehicle body, and the support frame is fixed to the vehicle body.

In the vehicle according to the embodiments of the present disclosure, the secondary photovoltaic panel slidably moves outwards to the expansion position relative to the primary photovoltaic panel by means of the solar photovoltaic panel assembly 10 as required. Therefore, it is possible to increase a power generation area of the solar photovoltaic panel assembly, thereby increasing a power generation amount to satisfy the user's requirements for power utilization.

According to some embodiments of the present disclosure, the roof of the vehicle body includes a transverse edge extending in a left-and-right direction of the vehicle, and a longitudinal edge extending in a forward-and-backward direction of the vehicle. The support frame is a rectangular frame, and includes short side frames opposite to each other and long side frames connected to the short side frames. A length of each of the long side frames is 0.8 times to 1 times a length of the transverse edge.

Additional aspects and advantages of the present disclosure will be provided at least in part in the following description, or will become apparent at least in part from the following description, or can be learned from practicing of the present disclosure.

REFERENCE NUMERALS vehicle 100, solar photovoltaic panel assembly 10, support frame 1, primary photovoltaic panel mounting layer 11, secondary photovoltaic panel sliding layer 12, lower bracket 13, upper pressing member 14, sliding rail 15, a first sliding rail segment 151, a second sliding rail segment 152, a third sliding rail segment 153, short side frame 16, long side frame 17, primary photovoltaic panel 2, secondary photovoltaic panel 3, support rod 31, driving member 4, driving element 41, retractable rod 42, rod hole 421, base 43, base hole 431, base bracket 51, base hinge pin 52, rod support 53, rod hinge pin 54, vehicle body connection portion 6, first wing plate 61, second wing plate 62, vehicle body 20, transverse edge 201, longitudinal edge 202, sunroof 203, exhaust fan 204.

DETAILED DESCRIPTION

Embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative merely, and are intended to explain, rather than limiting, the present disclosure.

In the description of the present disclosure, it should to be understood that, orientation or position relationship indicated by terms such as "longitudinal", "lateral", "length", "width", "thickness", "over", "below", "front", "back", "left", "right", "vertical", "horizontal", "top", "bottom", "in", "out", etc., is based on the orientation or position relationship shown in the accompanying drawings, and is merely for the convenience of describing the present disclosure and simplifying the description, rather than indicating or implying that the associated device or element must have a specific orientation, or be constructed and operated in a specific orientation, and therefore cannot be understood as a limitation on the present disclosure.

In addition, terms such as "first" and "second" are used herein for purposes of description and are not intended to indicate or imply relative importance or significance. Furthermore, the feature associated with "first" and "second" may include one or more this feature distinctly or implicitly. In the description of the present disclosure, "a plurality of" means two or more than two, unless specified otherwise.

In the present disclosure, unless specified or limited otherwise, the terms "mounted", "connected", "coupled", and "fixed" are understood broadly, such as fixed, detachable, or integrated connection, and may be mechanical, electrical, or mutual connection, and may also be direct connection or indirect connection via intermediation, and may further be inner communication or interaction between two components. The specific meaning of these terms in the embodiments of the present disclosure may be understood by those of the skill in the art as desired.

According to embodiments of the present disclosure, a solar photovoltaic panel assembly 10 and a vehicle 100 including the solar photovoltaic panel assembly 10 are described in detail below with reference to FIG. 1 to FIG. 17. The solar photovoltaic panel module 10 according to the embodiments of the present disclosure is appliable to vehicles such as a recreational vehicle and other occasions such as a roof of a house as desired.

With reference to FIG. 1 to FIG. 4, FIG. 7, FIG. 8, FIG. 10 and FIG. 11, the solar photovoltaic panel assembly 10 according to the embodiments of the present disclosure may include a support frame 1, a primary photovoltaic panel 2, a secondary photovoltaic panel 3, and a driving member 4.

Referring to FIG. 4, FIG. 7, FIG. 10, and FIG. 13, the support frame 1 has a primary photovoltaic panel mounting layer 11 and a secondary photovoltaic panel sliding layer 12. The primary photovoltaic panel mounting layer 11 and the secondary photovoltaic panel sliding layer 12 are laminated to each other in a thickness direction of the support frame 1.

A primary photovoltaic panel 2 is mounted on the primary photovoltaic panel mounting layer 11. A secondary photovoltaic panel 3 is mounted on the secondary photovoltaic panel sliding layer 12. The primary photovoltaic panel mounting layer 11 and the secondary photovoltaic panel sliding layer 12 are laminated to each other, which enables the primary photovoltaic panel 2 and the secondary photovoltaic panel 3 to be laminated to each other. Thus, it is possible to reasonably utilize a space of the support frame 1 in a thickness direction, so that an overall thickness of the solar photovoltaic panel assembly 10 is relatively thin. As a result, a height of the vehicle 100 would not be significantly increased when the solar photovoltaic panel assembly 10 is mounted on a vehicle body 20 of the vehicle 100, and thus the solar photovoltaic panel assembly 10 has less influence on trafficability of the vehicle 100. The thickness direction of the support frame 1 is an F5-F6 direction shown in FIG. 7 and FIG. 13.

The primary photovoltaic panel 2 is mounted on the primary photovoltaic panel mounting layer 11. The primary photovoltaic panel 2 is of a plate-shaped structure, and has a large surface, i.e., a surface having a larger area, perpendicular to the thickness direction of the support frame 1. In some embodiments, the primary photovoltaic panel 2 may be fixed on the primary photovoltaic panel mounting layer 11. That is, the primary photovoltaic panel 2 and the primary photovoltaic panel mounting layer 11 are arranged in a non-slidable structural form, so as to reduce the number of slidable members of the solar photovoltaic panel assembly 10.

The secondary photovoltaic panel 3 is mounted on the secondary photovoltaic panel sliding layer 12. The secondary photovoltaic panel 3 is of a plate-shaped structure, and has a large surface, i.e., a surface having a larger area, perpendicular to the thickness direction of the support frame 1. The secondary photovoltaic panel 3 is movable slidably to a storage position and an expansion position along the secondary photovoltaic panel sliding layer 12. When located at the storage position, the secondary photovoltaic panel 3 has a maximum overlapping area with the primary photovoltaic panel 2 in the thickness direction of the support frame 1, i.e., the secondary photovoltaic panel 3 can overlap with the primary photovoltaic panel 2 to the greatest extent. When located at the expansion position, the secondary photovoltaic panel 3 slidably moves outwards relative to the primary photovoltaic panel 2. That is, the secondary photovoltaic panel 3 may partially slidably move outwards relative to the primary photovoltaic panel 2, for example, to a semi-expansion position shown in FIG. 3 to FIG. 4; or the secondary photovoltaic panel 3 may also slidably move outwards relative to the primary photovoltaic panel 2 totally, for example, to a full expansion position shown in FIG. 7, FIG. 8, FIG. 10 and FIG. 11. When the secondary photovoltaic panel 3 slidably moves outwards relative to the primary photovoltaic panel 2, the overlapping area of the secondary photovoltaic panel 3 with the primary photovoltaic panel 2 in the thickness direction of the support frame 1 gradually decreases as an expansion degree becomes larger and larger. When the secondary photovoltaic panel 3 retracts inwards relative to the primary photovoltaic panel 2, the overlapping area of the secondary photovoltaic panel 3 with the primary photovoltaic panel 2 in the thickness direction of the support frame 1 gradually increases as the expansion degree becomes smaller and smaller. Areas of the primary photovoltaic panel 2 and the secondary photovoltaic panel 3 that receive sunlight are power generation areas. When the secondary photovoltaic panel 3 is at the expansion position, a total power generation area of the primary photovoltaic panel 2 and the secondary photovoltaic panel 3 is increased, and a power generation amount is increased accordingly. When the secondary photovoltaic panel 3 is at the storage position, the total power generation area of the primary photovoltaic panel 2 and the secondary photovoltaic panel 3 is reduced, and thus the power generation amount is decreased accordingly.

The driving member 4 is mounted on the support frame 1 and configured to drive the secondary photovoltaic panel 3 to slidably move along the secondary photovoltaic panel sliding layer 12. In some embodiments, the driving member 4 is an electrical cylinder to push the secondary photovoltaic panel 3 to slidably move outwards relative to the primary photovoltaic panel 2, or pull the secondary photovoltaic panel 3 to retract inwards relative to the primary photovoltaic panel 2.

With the solar photovoltaic panel assembly 10 according to the embodiments of the present disclosure, the secondary photovoltaic panel 3 slidably moves outwards to the expansion position relative to the primary photovoltaic panel 2, which can increase a power generation area and a generated output of the solar photovoltaic panel assembly 10, thereby increasing a power generation amount to satisfy user's requirements for power utilization. A slidable movement of the secondary photovoltaic panel 3 can be automated by means of the driving member 4, so as to save user's physical power and improve user experience. The support frame 1 serves as a bearing member for bearing the primary photovoltaic panel 2, the secondary photovoltaic panel 3, and the driving member 4, and provides fixing and supporting for the primary photovoltaic panel 2, the secondary photovoltaic panel 3, and the driving member 4, so that the solar photovoltaic panel assembly 10 is formed as a whole. As a result, the solar photovoltaic panel assembly 10 can be easily carried, assembled, and disassembled as a whole. According to the embodiments of the present disclosure, the solar photovoltaic panel assembly 10 has a stable and reliable structure, long service life, and good use effect.

According to some embodiments of the present disclosure, the support frame 1 is constructed as a frame structure penetrated in a thickness direction. In this way, the support frame 1 is simple in structure and light in weight, which would not significantly increase an overall weight of the solar photovoltaic panel assembly 10. In addition, energy consumption of the vehicle 100 would not be significantly increased when the solar photovoltaic panel assembly 10 is applied in the vehicle 100. In other words, the support frame 1 of the frame structure can reduce the weight of the support frame 1 and facilitate a lightweight design of the solar photovoltaic panel assembly 10. An area of middle through region of the support frame 1 matches with an area of the large surface of each of the primary photovoltaic panel 2 and the secondary photovoltaic panel 3, and the support frame 1 has a small thickness. Thus, a roof space of the vehicle can be saved when the solar photovoltaic panel assembly 10 is mounted on a roof of the vehicle body 20.

According to some embodiments of the present disclosure, one secondary photovoltaic panel sliding layer 12 and one secondary photovoltaic panel 3 are provided. The secondary photovoltaic panel 3 is mounted on the secondary photovoltaic panel sliding layer 12. The secondary photovoltaic panel sliding layer 12 is located on a side of the primary photovoltaic panel mounting layer 11 facing towards the vehicle body 20 of the vehicle 100. In this way, the secondary photovoltaic panel 3 is located on the side of the primary photovoltaic panel 2 facing towards the vehicle body 20 of the vehicle 100. Thus, when the secondary photovoltaic panel 3 is at the storage position, the primary photovoltaic panel 2 can shield the secondary photovoltaic panel 3 to the maximum extent, and when the secondary photovoltaic panel 3 is at a non-full-expansion position, the primary photovoltaic panel 2 can partially shield the secondary photovoltaic panel 3. The shielding of the primary photovoltaic panel 2 can prevent materials from falling into sliding rails of the secondary photovoltaic panel 3, so as to protect slidable movement of the secondary photovoltaic panel 3 to allow the secondary photovoltaic panel 3 to slidably move more steadily and smoothly. In addition, when one secondary photovoltaic panel sliding layer 12 is provided, the secondary photovoltaic panel sliding layer 12 and the primary photovoltaic panel 2 form a two-layer photovoltaic panel structure. As a result, the thickness of the solar photovoltaic panel assembly 10 would not be significantly increased, and thus the height of the vehicle 100 would not be significantly increased when the solar photovoltaic panel assembly 10 is mounted on the vehicle body 20 of the vehicle 100, so that the solar photovoltaic panel assembly 10 has less influence on the trafficability of the vehicle 100. The solar photovoltaic panel assembly 10 has a thickness direction that is the F5-F6 direction shown in FIG. 7 and FIG. 13.

When the vehicle 100 is moving, an additional secondary photovoltaic panel 3 may be hidden below an uppermost primary photovoltaic panel 2 to improve driving safety of the vehicle 100. When the vehicle 100 stops moving, the hidden secondary photovoltaic panel 3 can be extended by the driving member 4, thereby realize increase generated output.

In addition, the solar photovoltaic panel assembly 10 is designed as a two-layer structure including the primary photovoltaic panel 2 and the secondary photovoltaic panel 3. Such a two-layer structure has a proper size and weight, and a demand for additional power generation can be satisfied, and thus the two-layer structure has better practicability. When the solar photovoltaic panel assembly 10 is designed as a three-layer structure, the weight of the solar photovoltaic panel assembly 10 would be increased along with additionally increasing one secondary photovoltaic panel 3, and a load on the vehicle 100 would also be increased. However, when the solar photovoltaic panel assembly 10 is designed as the two-layer structure, the height of the solar photovoltaic panel assembly 10 would not be increased too much, and the solar photovoltaic panel assembly 10 is almost flush with an exhaust fan 204 or a sunroof 203 at the roof of the vehicle. Adding one secondary photovoltaic panel 3 will increases the height by 60 mm. Therefore, when the solar photovoltaic panel assembly 10 is designed as the three-layer structure, there will be a potential influence on a height limitation of the vehicle 100 in moving.

In some other embodiments of the present disclosure, regardless of the above factors, two, three, or more secondary photovoltaic panel sliding layers 12 may be provided, and one secondary photovoltaic panel 3 is mounted at each of the secondary photovoltaic panel sliding layers 12. Therefore, the secondary photovoltaic panel 3 can slidably move to the expansion position by a user as required, to increase the power generation area of the solar photovoltaic panel assembly 10.

In some embodiments of the present disclosure, as illustrated in FIG. 2, FIG. 4 to FIG. 6, FIG. 10, FIG. 11, and FIG. 16, the driving member is in a form of an electrical retractable rod and includes a driving element 41 and a retractable rod 42. The driving element 41 includes a base 43 hinged to the support frame 1. The retractable rod 42 has one end located in the driving element 41 and another end hinged to the secondary photovoltaic panel 3. The driving element 41 is configured to drive the retractable rod 42 to extend or retract relative to the driving element 41. The driving element 41 may be constructed as a cylindrical structure containing a driving motor. When the retractable rod 42 extends outwards relative to the driving element 41, the retractable rod 42 pushes the secondary photovoltaic panel 3 to slidably move outwards, and when the retractable rod 42 retracts inwards relative to the driving element 41, the retractable rod 42 pulls the secondary photovoltaic panel 3 to retract inwards. The electrical retractable rod allows for an automatic slidable movement of the secondary photovoltaic panel 3, thereby saving the user's physical power.

Figure 4:
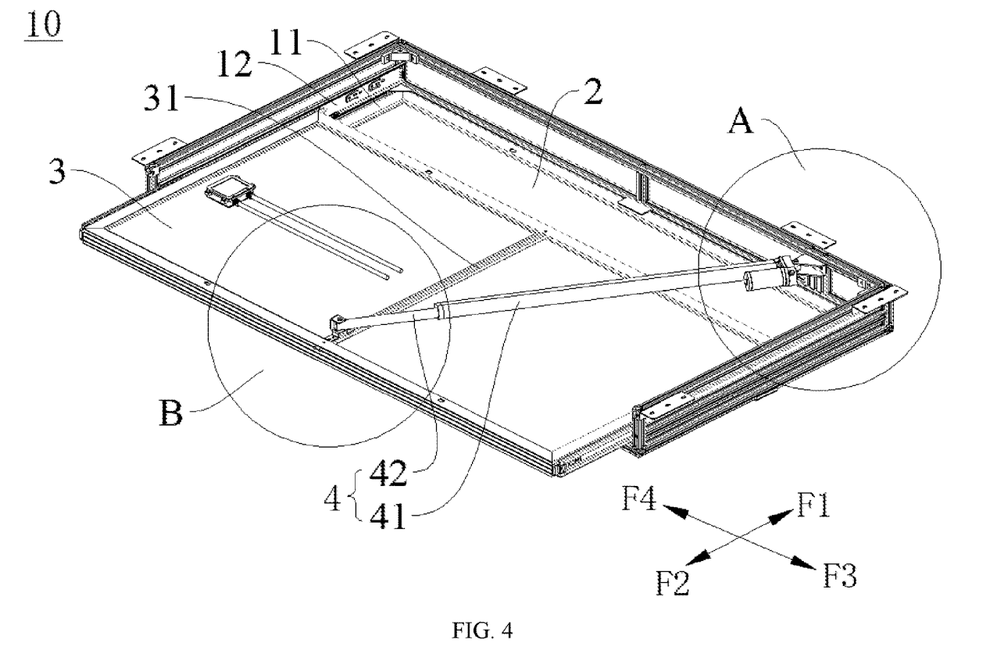
FIG. 4 is a schematic back view of a solar photovoltaic panel assembly at a semi-expansion position according to an embodiment of the present disclosure.
Figure 5:
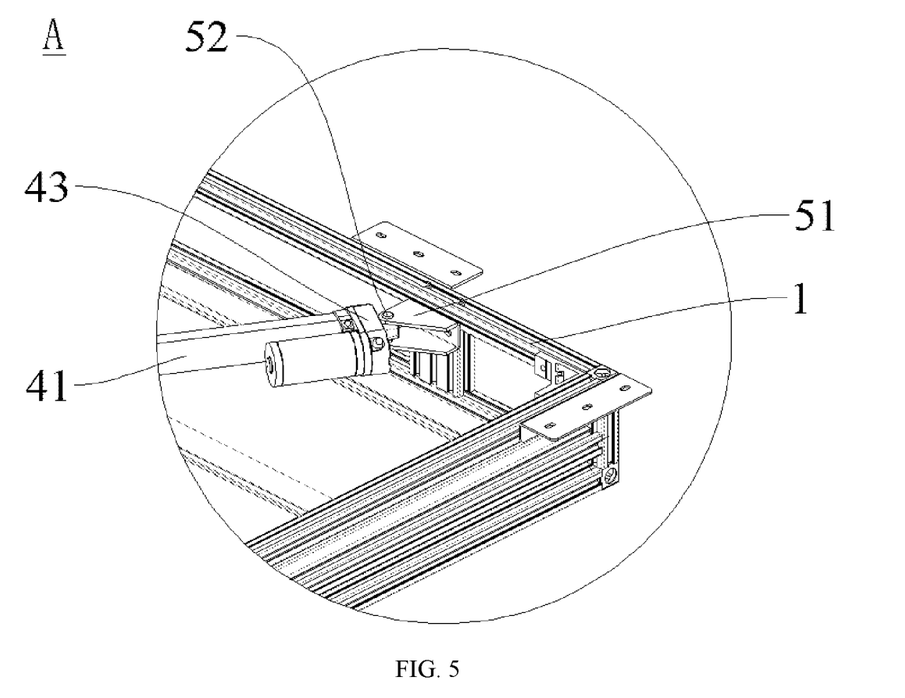
FIG. 5 is a partially enlarged view at Part A in FIG. 4.
Figure 6:
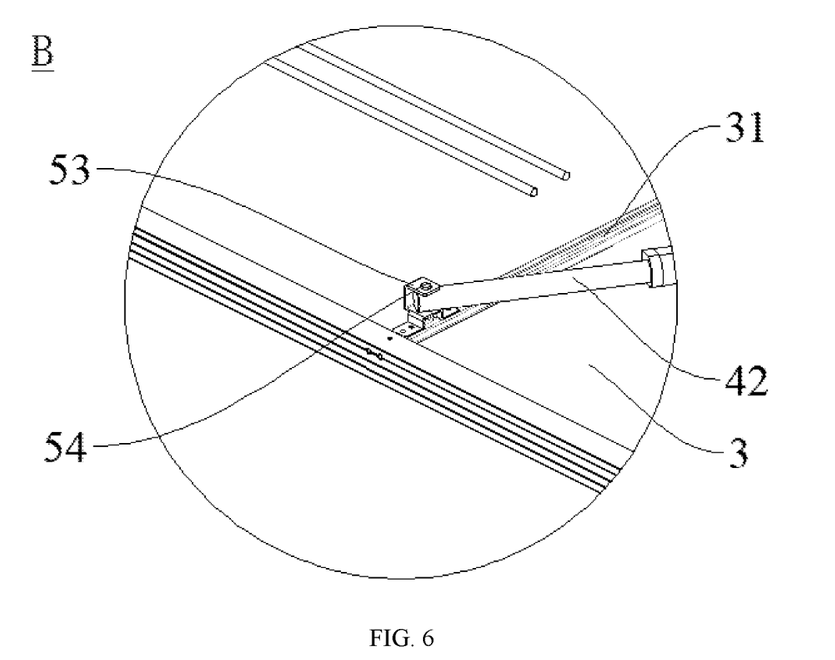
FIG. 6 is a partially enlarged view at Part B in FIG. 4.
Figure 7:
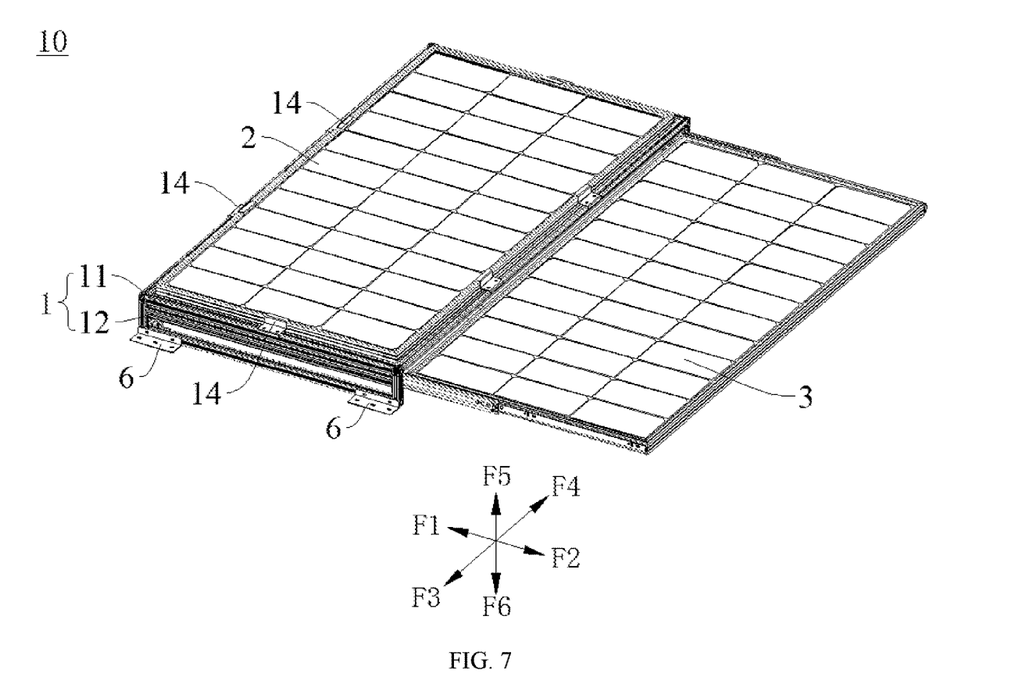
FIG. 7 is a schematic front view of a solar photovoltaic panel assembly at a full expansion position from a viewing angle according to an embodiment of the present disclosure.
Figure 8:
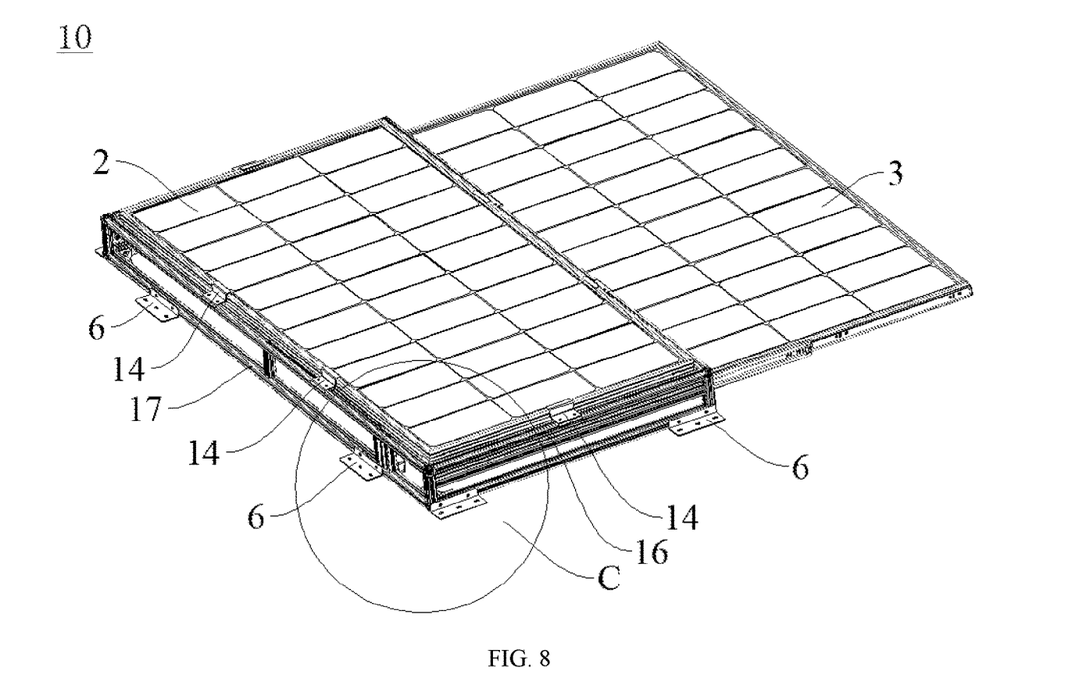
FIG. 8 is a schematic front view of a solar photovoltaic panel assembly at a full expansion position from another viewing angle according to an embodiment of the present disclosure.
Figure 16:
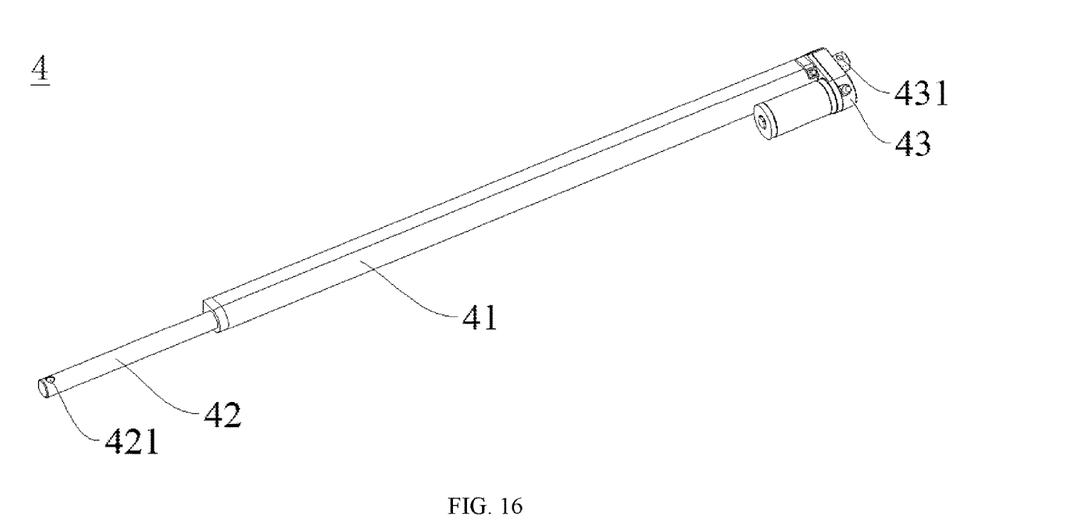
FIG. 16 is a schematic perspective view of a driving member.

In some embodiments of the present disclosure, as illustrated in FIG. 4, FIG. 5 and FIG. 16, a base bracket 51 is disposed on the support frame 1, and the base 43 of the driving element 41 is hinged to the base bracket 51 by a base hinge pin 52, so as to hinge the base 43 of the driving element 41 to the support frame 1. In some embodiments, the base bracket 51 is fixed on the support frame 1, and a base hole 431 is formed on the base 43 of the driving element 41 and configured to allow the base hinge pin 52 to pass therethrough. The base hinge pin 52 passes through the base hole 431 and the support frame 1. The driving element 41 is rotatable about an axis of the base hinge pin 52. Referring to FIG. 4, FIG. 6, and FIG. 16, a rod support 53 is disposed on the secondary photovoltaic panel 3, and the retractable rod 42 is hinged to the rod support 53 by a rod hinge pin 54, so as to hinge the other end of the retractable rod 42 to the secondary photovoltaic panel 3. In some embodiments, the rod support 53 is fixed on the secondary photovoltaic panel 3, and a rod hole 421 is formed on the retractable rod 42 and configured to allow by the rod hinge pin 54 to pass therethrough. The rod hinge pin 54 passes through the rod hole 421 and the secondary photovoltaic panel 3, and the retractable rod 42 is rotatable about an axis of the rod hinge pin 54. In this way, it is possible to avoid stuck phenomenon from occurring at a connection between the retractable rod 42 and the secondary photovoltaic panel 3 and a connection between the driving element 41 and the support frame 1 during the extending or retracting of the retractable rod 42.

As illustrated in FIG. 4 and FIG. 6, the secondary photovoltaic panel 3 has a support rod 31. The support rod 31 is located in the middle of the secondary photovoltaic panel 3 in the F1-F2 direction. Further, in the F1-F2 direction, the support rod 31 extends in a sliding-out direction of the secondary photovoltaic panel 3, and the other end of the retractable rod 42 is hinged to the support rod 31.

In some embodiments of the present disclosure, the driving member 4 is of a rod-shaped structure, and a length extending direction of the driving member 4 intersects with the sliding-out direction of the secondary photovoltaic panel 3. In some embodiments, referring to FIG. 2 and FIG. 10, the sliding-out direction of the secondary photovoltaic panel 3 is the F1-F2 direction, and the length extending direction of the driving member 4 intersects with the F1-F2 direction. The length extending direction of the driving member 4 is not parallel to the sliding-out direction of the secondary photovoltaic panel 3, which can shorten a size of the entire solar photovoltaic panel assembly 10 in the sliding-out direction of the secondary photovoltaic panel 3.

Figure 2:
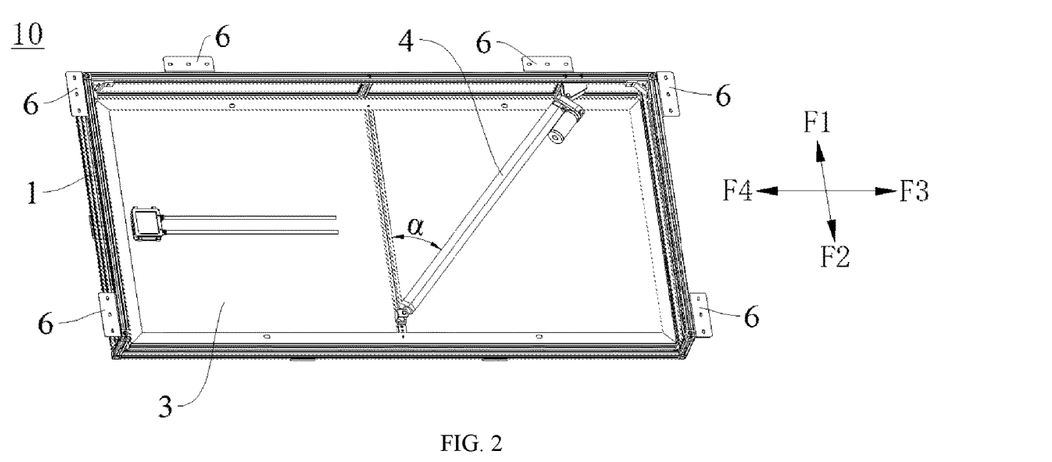
FIG. 2 is a schematic back view of a solar photovoltaic panel assembly at a storage position according to an embodiment of the present disclosure.
Figure 3:
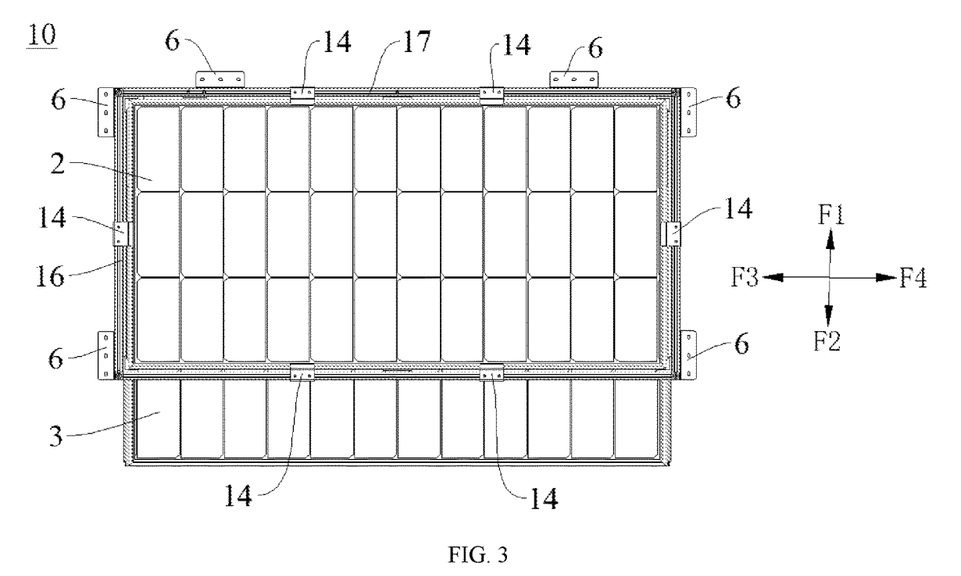
FIG. 3 is a schematic front view of a solar photovoltaic panel assembly at a semi-expansion position according to an embodiment of the present disclosure.
Figure 10:
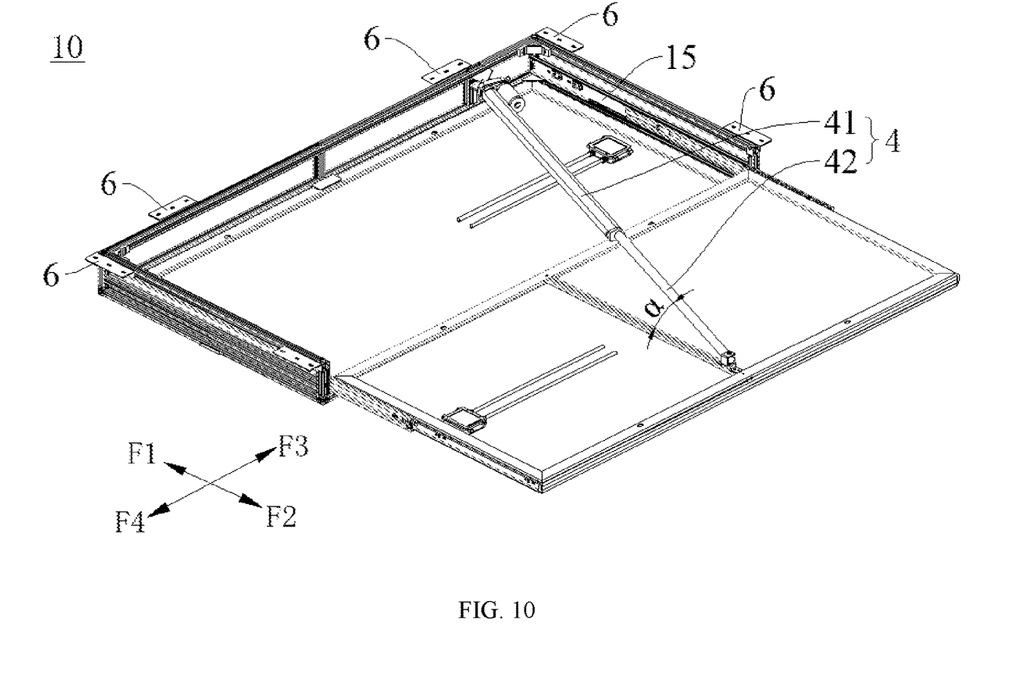
FIG. 10 is a schematic back view of a solar photovoltaic panel assembly at a full expansion position from a viewing angle according to an embodiment of the present disclosure.
Figure 11:
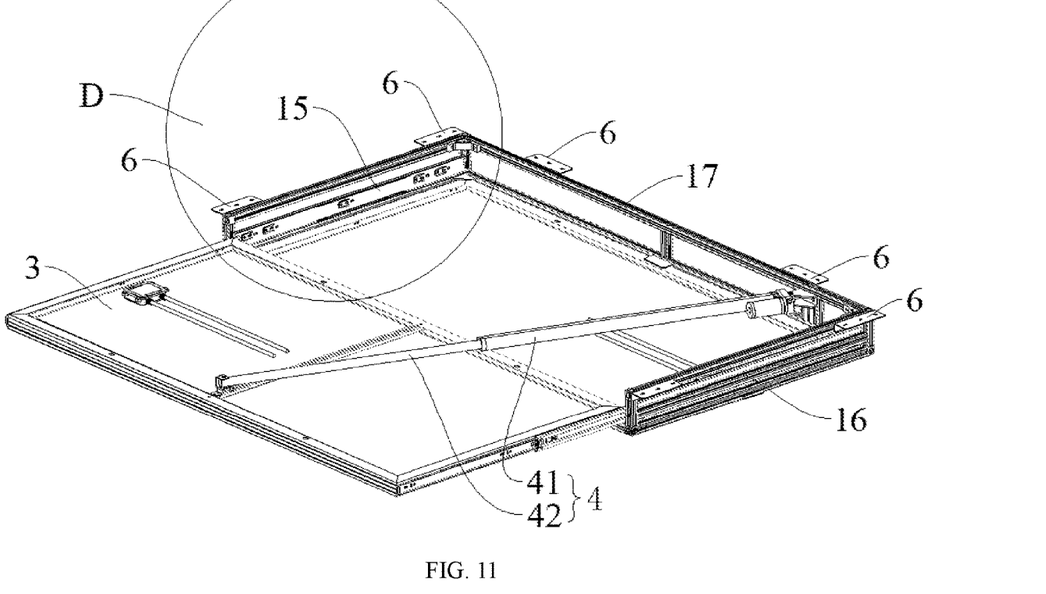
FIG. 11 is a schematic back view of a solar photovoltaic panel assembly at a full expansion position from another viewing angle according to an embodiment of the present disclosure.
Figure 12:
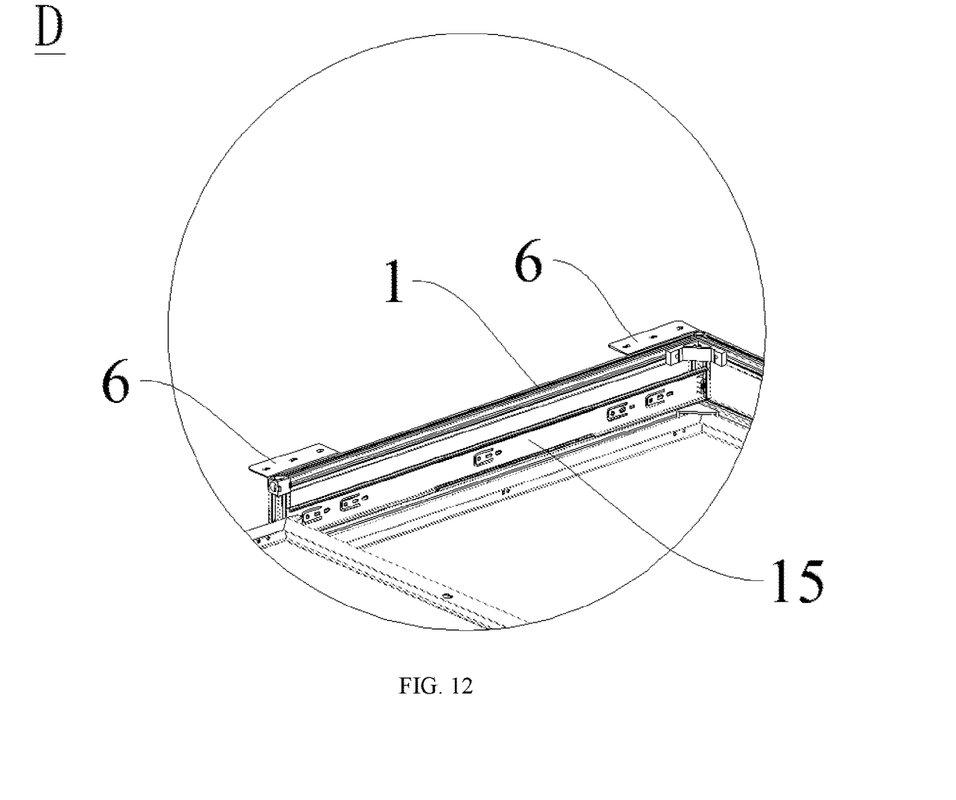
FIG. 12 is a partially enlarged view at Part D in FIG. 11.
Figure 13:
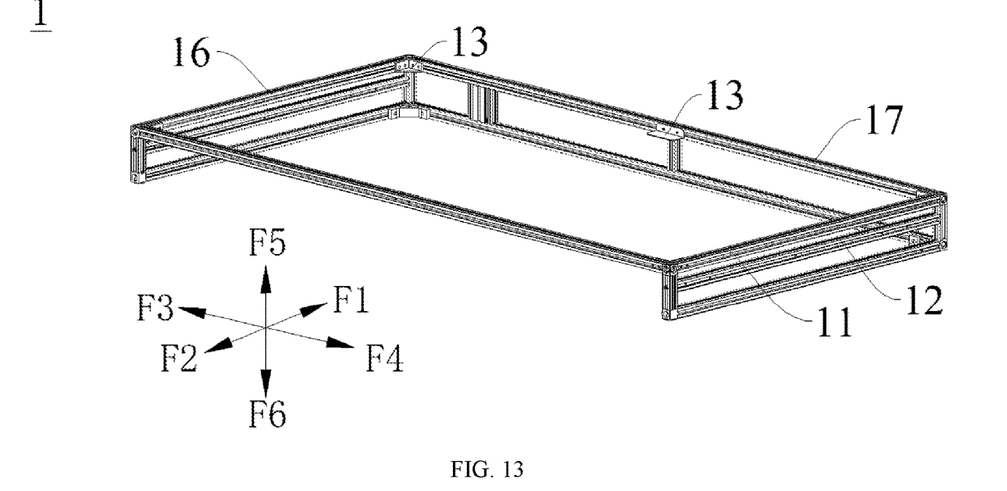
FIG. 13 is a schematic perspective view of a support frame.
Figure 14:
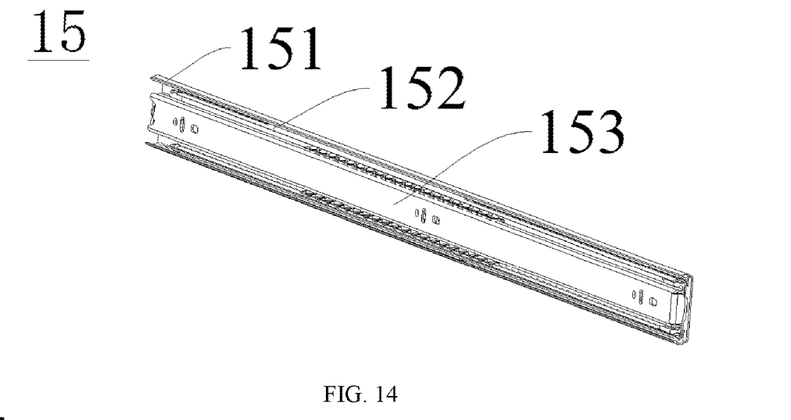
FIG. 14 is a schematic view of sliding rails at a storage position.
Figure 15:
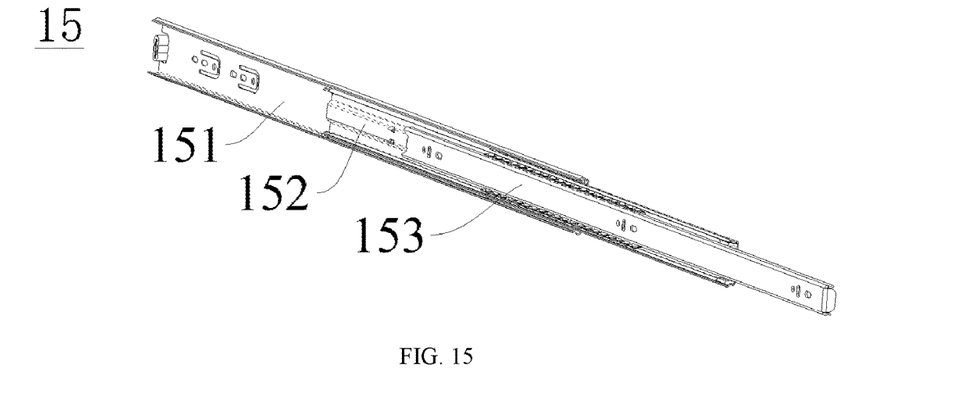
FIG. 15 is a schematic view of sliding rails at an expansion position.

In some embodiments of the present disclosure, an angle between the length extending direction of the driving member 4 and the sliding-out direction of the secondary photovoltaic panel 3 ranges from 30° to 60°. As illustrated in FIG. 2 and FIG. 10, the sliding-out direction of the secondary photovoltaic panel 3 is the F1-F2 direction, and the angle between the length extension direction of the driving member 4 and the F1-F2 direction is $\alpha$, where $30°\leq\alpha\leq60°$. During the gradual outward slidable movement of the secondary photovoltaic panel 3 from the storage position, the angle $\alpha$ gradually decreases, and during the gradual inward retraction of the secondary photovoltaic panel 3 from the expansion position, the angle $\alpha$ gradually increases. For example, when the secondary photovoltaic panel 3 is at the storage position, the angle $\alpha$ is shown in FIG. 2 and is 50°, and when the secondary photovoltaic panel 3 is at the full expansion position, the angle $\alpha$ is shown in FIG. 10 and is 30°.

In some optional embodiments of the present disclosure, the driving member 4 is of the rod-shaped structure, and the length extending direction of the driving member 4 is parallel to the sliding-out direction of the secondary photovoltaic panel 3.

In some embodiments, the driving element 41 includes a driving motor and a leading screw. The driving motor is configured to drive the leading screw to rotate. A nut is disposed on the retractable rod 42 and threaded with the leading screw. When the leading screw is driven by the driving motor to rotate forwardly, the retractable rod 42 is driven by the nut to extend; and when the leading screw is driven by the driving motor to rotate reversely, the retractable rod 42 is driven by the nut to retract. The driving motor can further drive the retractable rod 42 to extend or retract by means of other transmission mechanisms such as a gear and rack transmission mechanism. A gear is disposed on an output shaft of the driving motor. A rack is disposed on the retractable rod 42 and engaged with the gear. When the driving motor drives the gear to rotate forwardly, the gear drives the rack to drive the retractable rod 42 to extend; and when the driving motor drives the gear to rotate reversely, the gear drives the rack to drive the retractable rod 42 to retract.

In some embodiments, a stroke of the retractable rod 42 may be 600 mm.

In some embodiments of the present disclosure, the driving member 4 may be a direct-current electrical retractable rod and have characteristics of a long extending volume, a slow rotational speed, a large torque, and is rotatable forwardly and reversely through current reversing.

In some embodiments of the present disclosure, the driving member 4 further includes a first limiting switch and a second first limiting switch. The first limiting switch is configured to limit an ultimate extending position of the retractable rod 42 extending from the driving element 41, and the second limiting switch is configured to limit an ultimate retraction position of the retractable rod 42 retracting towards the driving element 41. The ultimate position of the retractable rod 42 is limited by the first limiting switch and the second limiting switch, so that it is possible to prevent the driving motor from being burnt due to over-travel. Therefore, the retractable rod 42 has higher reliable extension and retraction actions, and thus not prone to be damaged. In some embodiments, when the retractable rod 42 extends to the ultimate extending position from the driving element 41, the first limiting switch is triggered by the retractable rod 42 to generate a first signal to control the driving motor to stop rotating, and when the retractable rod 42 retracts into the ultimate retraction position from the driving element 41, the second limiting switch is triggered by the retractable rod 42 to generate a second signal to control the driving motor to stop rotating.

In some embodiments of the present disclosure, the driving member 4 further includes a control unit. The control unit is configured to drive the retractable rod 42 to extend or retract. In some embodiments of the present disclosure, the control unit may be a remote-control unit to remotely control the retractable rod 42 to extend or retract. For example, the retractable rod 42 may be controlled to extend or retract by the user in a passenger compartment without walking to a position where the solar photovoltaic panel assembly 10 is mounted, which results in improved user experience.

In some embodiments of the present disclosure, referring to FIG. 1, FIG. 7, FIG. 8, and FIG. 13, the primary photovoltaic panel mounting layer 11 includes a lower bracket 13 (not illustrated in FIG. 13) and an upper pressing member 14. The lower bracket 13 has a lower supporting surface. The upper pressing member 14 has an upper pressing surface. The lower supporting surface is located on a side of the upper pressing surface. When the solar photovoltaic panel assembly 10 is mounted at the roof of the vehicle 100, the lower supporting surface is located on a side of the upper pressing surface facing towards the vehicle body 20 of the vehicle 100. A primary photovoltaic panel mounting space is formed between the lower supporting surface and the upper pressing surface. A bottom surface of the primary photovoltaic panel 2 is supported by the lower supporting surface, so as to support the primary photovoltaic panel 2 from below. As a result, it is possible to prevent the primary photovoltaic panel 2 from falling from below the supporting frame 1. The upper pressing surface is pressed against a top surface of the primary photovoltaic panel 2 to press the primary photovoltaic panel 2 from above. As a result, it is possible to prevent the primary photovoltaic panel 2 from being separated from the support frame 1 from above. The lower supporting surface and the upper pressing surface cooperate with each other to confine the primary photovoltaic panel 2 in the primary photovoltaic panel mounting space. An arrangement direction of the lower supporting surface is adapted to the bottom surface of the primary photovoltaic panel 2, and an arrangement direction of the upper pressing surface is adapted to the top surface of the primary photovoltaic panel 2. For example, when the top surface and the bottom surface of the primary photovoltaic panel 2 are parallel to each other, the lower supporting surface and the upper pressing surface are also arranged in parallel. In addition, both the lower supporting surface and the upper pressing surface may be perpendicular to the thickness direction of the supporting frame 1.

In some embodiments of the present disclosure, as illustrated in FIG. 10 to FIG. 12, FIG. 14 and FIG. 15, sliding rails 15 are arranged opposite to each other on the secondary photovoltaic panel sliding layer 12. The secondary photovoltaic panel 3 is configured to be slidably engaged with the sliding rails 15 at two sides. The sliding rails 15 at the two sides are configured to guide the slidable movement of the secondary photovoltaic panel 3, so that the secondary photovoltaic panel 3 has more stable and smoother slidable movement.

In some embodiments of the present disclosure, referring to FIG. 3, FIG. 8, FIG. 11, and FIG. 13, the support frame 1 is a rectangular frame with a predetermined thickness. The rectangular frame includes short side frames 16 opposite to each other and long side frames 17 connected to the short side frames 16. A length of each of the short side frames 16 is smaller than a length of each of the long side frames 17, and the sliding rails 15 are arranged on the short side frames 16 opposite to each other, respectively. In some embodiments of the present disclosure, the short side frames 16 are arranged in the F1-F2 direction, and the long side frames 17 are arranged in the F3-F4 direction. An arrangement direction of the short side frames 16 is the same as a slidable moving direction of the secondary photovoltaic panel 3.

In some embodiments of the present disclosure, as illustrated in FIG. 10 to FIG. 12, FIG. 14 and FIG. 15, the sliding rails 15 are arranged in the F1-F2 direction, and each have a three-segment load-bearing sliding rail structure. Further, each of the sliding rails 15 may include a first sliding rail segment 151, a second sliding rail segment 152, and a third sliding rail segment 153. The first sliding rail segments 151 are fixed on the short side frames 16 opposite to each other. For example, the first sliding rail segments 151 may be fixed on the short side frames 16 by means of fasteners such as screws. The second sliding rail segment 152 is disposed on the corresponding first sliding rail segment 151 and is slidable in a length direction of the first sliding rail segment 151. The third sliding rail segment 153 is disposed on the corresponding second sliding rail segment 152 and is slidable in the length direction of the first sliding rail segment 151. The third sliding rail segments 153 are further fixed on the secondary photovoltaic panel 3. For example, the third sliding rail segments 153 may be fixed on the secondary photovoltaic panel 3 by means of fasteners such as screw. In this way, it is possible to drive the secondary photovoltaic panel 3 to slidably move together with the sliding of the third sliding rail segments 153.

Referring to FIG. 1 to FIG. 4 and FIG. 7 to FIG. 12, a vehicle body connection portion 6 is disposed on the support frame 1. The vehicle body connection portion 6 is configured to be connected to the vehicle body 20 of the vehicle 100 when the solar photovoltaic panel assembly 10 is mounted on the vehicle body 20 of the vehicle 100, so as to fix and mount the solar photovoltaic panel assembly 10 on the vehicle body 20, thereby preventing the solar photovoltaic panel assembly 10 from falling and being separated from the vehicle body 20.

Figure 9:
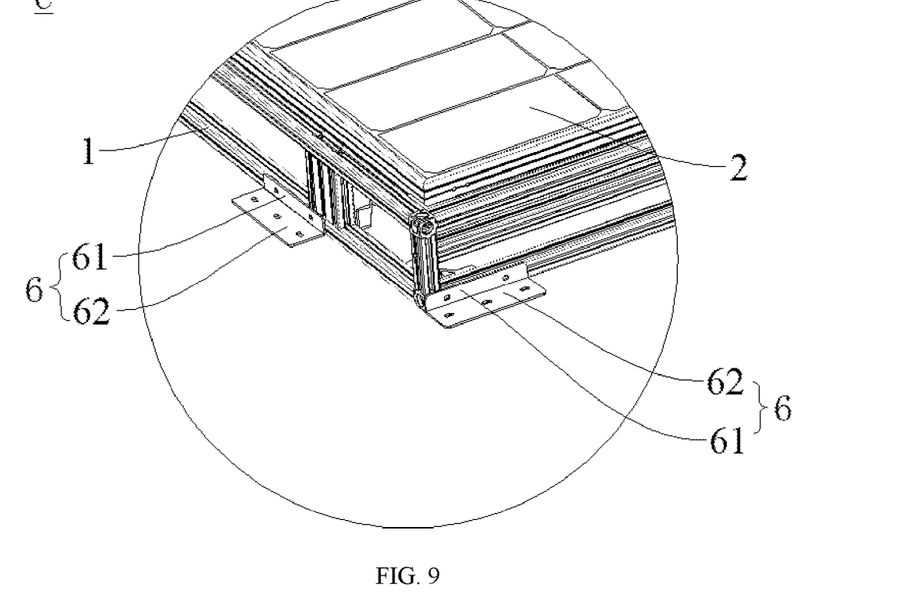
FIG. 9 a partially enlarged view at Part C in FIG. 8.

In some embodiments of the present disclosure, as illustrated in FIG. 9, the vehicle body connection portion 6 is of a fixed wing form, and includes a first wing plate 61 and a second wing plate 62. The first wing plate 61 is fixed on the support frame 1, and the second wing plate 62 is connected to the first wing plate 61. Further, the second wing plate 62 and the vehicle body 20 of the vehicle 100 are connected to each other through bonding and/or by means of a fastener. That is, the second wing plate 62 and the vehicle body 20 may be connected through bonding, by means of the fasteners, or through a combination of the bonding and the fasteners, and the suitable connection manner therebetween may be selected by the user according to actual requirements. In an example shown in FIG. 9, the second wing plate 62 has a plurality of bolt holes, through which bolts pass. In some embodiments of the present disclosure, a silicone structural adhesive may be selected during the bonding, and a bonding strength may at least bear an external force of 3000 N, so that an inertia force caused by a jolting or emergency braking when the vehicle 100 is moving would not loosen the connection between the second wing plate 62 and the vehicle body connection portion 6.

In some embodiments of the present disclosure, the primary photovoltaic panel 2 and the secondary photovoltaic panel 3 have a same structure and each include a photovoltaic panel frame and a photovoltaic panel body. The photovoltaic panel frame is constructed as a frame-type structure circumferentially closed and penetrated in a thickness direction, and the photovoltaic panel body is mounted within a space circumferentially enclosed by the photovoltaic panel frame. In some embodiments of the present disclosure, the primary photovoltaic panel 2 and the secondary photovoltaic panel 3 are the same both in size and model. Further, when the secondary photovoltaic panel 3 is at the full expansion position, the primary photovoltaic panel 2 and the secondary photovoltaic panel 3 have the greatest total power generation area that is a total power generation area of the two photovoltaic panels, and when the secondary photovoltaic panel 3 is at the storage position, the total power generation area of the primary photovoltaic panel 2 and the secondary photovoltaic panel 3 is reduced to a power generation area of one photovoltaic panel. When the secondary photovoltaic panel 3 is at the expansion position, the generated output of the solar photovoltaic panel assembly 10 can be increased. For example, the generated output of the solar photovoltaic panel assembly can be increased up to 1 time to 2 times.

The photovoltaic panel frame of the primary photovoltaic panel 2 is mounted at the primary photovoltaic panel mounting layer 11, and a bottom surface of the photovoltaic panel frame of the primary photovoltaic panel 2 is supported by the lower supporting surface of the lower bracket 13 to support the primary photovoltaic panel 2 from below. Thus, it is possible to prevent the primary photovoltaic panel 2 from falling from below the supporting frame 1. The upper pressing surface is pressed against the top surface of the photovoltaic panel frame of the primary photovoltaic panel 2 to press the primary photovoltaic panel 2 from above. Thus, it is possible to prevent the primary photovoltaic panel 2 from being separated from the support frame 1 from above. The photovoltaic panel frame of the secondary photovoltaic panel 3 is mounted on the sliding rails 15 of the secondary photovoltaic panel sliding layer 12, and is slidable along the sliding rails 15.

In an embodiment, the primary photovoltaic panel 2 is a solar photovoltaic panel of 195 W. The secondary photovoltaic panel 3 is a solar photovoltaic panel of 195 W and has a same size as the primary photovoltaic panel 2. Further, the primary photovoltaic panel 2 has a power of 195 W, and the secondary photovoltaic panel 3 has a power of 195 W. As a result, the solar photovoltaic panel assembly 10 has a total power close to 400 W.

In some embodiments of the present disclosure, the support frame 1 is an aluminum profile frame. The photovoltaic panel frame is an aluminum alloy frame. The vehicle body connection portion 6 is an aluminum alloy wing. In this way, all of the support frame 1, the photovoltaic panel frame, and the vehicle body connection portion 6 have better strength and lighter weight, which can achieve the lightweight design of the solar photovoltaic panel assembly 10. The aluminum profile frame may be conveniently disassembled and assembled, and has small packaging volume, a low weight, and a low transportation cost. Both the primary photovoltaic panel 2 and the secondary photovoltaic panel 3 are of an aluminum alloy frame glass structure, which has a strong load bearing, firm structure, hard texture, and longer service life.

Figure 1:
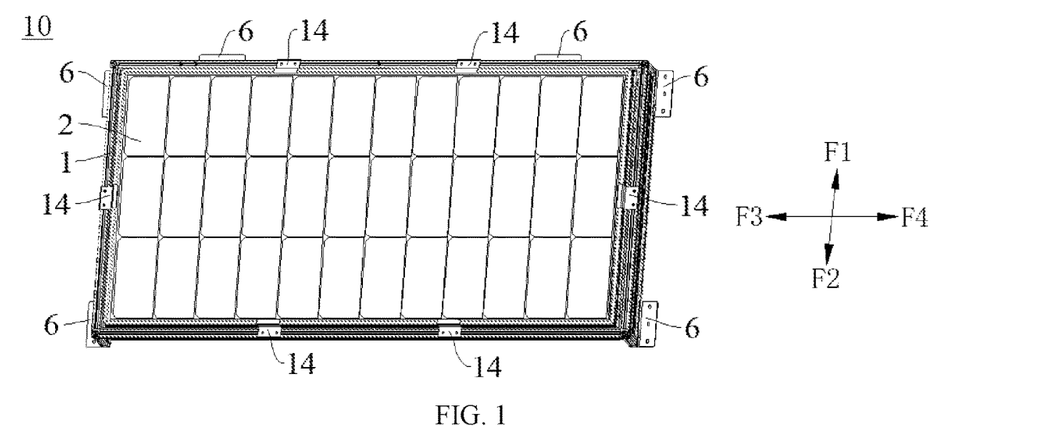
FIG. 1 is a schematic front view of a solar photovoltaic panel assembly at a storage position according to an embodiment of the present disclosure.

As illustrated in FIG. 1, according to another aspect of the embodiments of the present disclosure, a vehicle 100 is provided. The vehicle 100 includes a vehicle body 20 and the solar photovoltaic panel assembly 10 as described in the above embodiments. The solar photovoltaic panel assembly 10 is located on a roof of the vehicle body 20. The support frame 1 is fixed to the vehicle body 20. In some embodiments of the present disclosure, the vehicle body connecting portion 6 of the support frame 1 is fixed to the vehicle body 20. In this way, the solar photovoltaic panel assembly 10 can easily receive sunlight irradiation to satisfy demands for the power generation.

In some embodiments of the present disclosure, the vehicle 100 further includes a controller and an energy storage battery. The controller is adapted to be connected to the primary photovoltaic panel 2 and the secondary photovoltaic panel 3. The energy storage battery is connected to the controller. The controller is configured to convert solar energy from the primary photovoltaic panel 2 and/or the secondary photovoltaic panel 3 into electric energy and store the electric energy in the energy storage battery. The electric energy in the energy storage battery can be used by an electrical equipment. The energy storage battery may directly provide a direct current for the electrical equipment, and may also provide an alternating current for the electric equipment by means of an inverter. In some embodiments of the present disclosure, the energy storage battery may be a lithium battery having a low cost. The controller and the energy storage battery may be placed inside the vehicle 100, and a wire of the solar photovoltaic panel assembly 10 extends into an interior of the vehicle 100 to supply power for the energy storage battery by the controller.

The vehicle 100 may be a recreational vehicle, and the electric power generated by the solar photovoltaic panel assembly 10 can be used by the electrical equipment in the recreational vehicle such as an electronic device, a television, a refrigerator, an air conditioner, and a water pumping device.

In the vehicle 100 according to the embodiments of the present disclosure, the secondary photovoltaic panel 3 slidably moves outwards to the expansion position relative to the primary photovoltaic panel 2 by means of the solar photovoltaic panel assembly 10 as required, so as to increase the power generation area of the solar photovoltaic panel assembly 10, thereby increasing the power generation amount to satisfy the user's requirements for power utilization.

Figure 17:
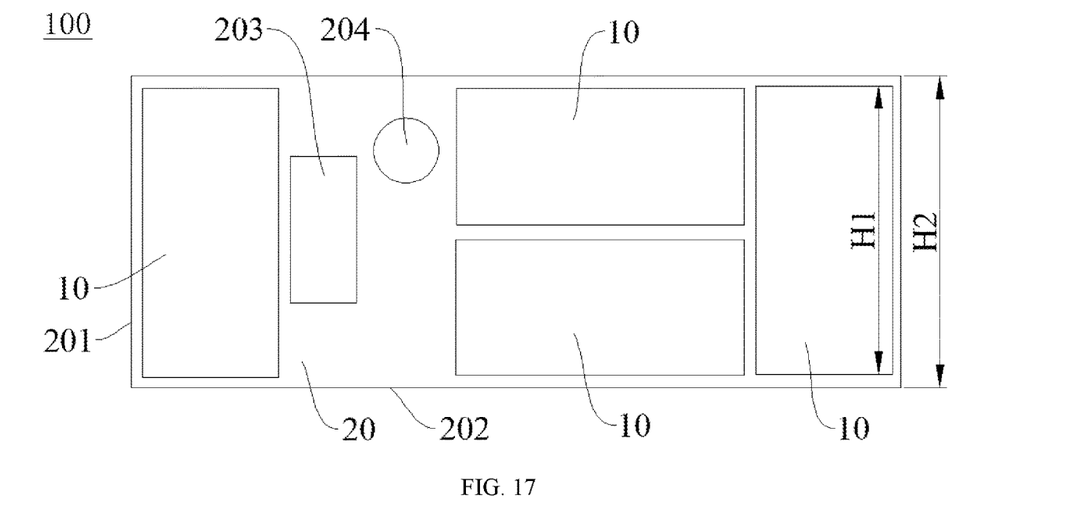
FIG. 17 is a schematic view of a solar photovoltaic panel assembly at a top of a vehicle body according to an embodiment of the present disclosure.

In some embodiments of the present disclosure, the roof of the vehicle body 20 includes a transverse edge 201 extending in a left-and-right direction of the vehicle 100, and a longitudinal edge 202 extending in a forward-and-backward direction of the vehicle 100. The support frame 1 is a rectangular frame and has a predetermined thickness. The support frame 1 includes short side frames 16 opposite to each other and long side frames 17 connected to the short side frames 16. A length of each of the long side frames 17 is 0.8 times to 1 times a length of the transverse edge 201. In some embodiments of the present disclosure, the length of each of the long side frame 17 is H1, the length of the transverse edge 201 is H2, where H1: H2=0.8~1. In some embodiments, H1: H2 may be 0.8, 0.9, 1, etc. In this way, the solar photovoltaic panel assembly 10 is in an elongated shape, which can maximize the use of a space at the roof of the vehicle body 20. The length of the long side frame 17 is approximately equal to the length of the transverse edge 201, and the secondary photovoltaic panel 3 extends beyond the long side frames 17.

A sunroof 203 and an exhaust fan 204 are disposed on the roof of the vehicle body 20, and the solar photovoltaic panel assembly 10 is arranged to be staggered with the sunroof 203 and the exhaust fan 204.

In the description of this specification, descriptions with reference to the terms "an embodiment", "some embodiments", "examples", "specific examples", or "some examples", etc. mean that specific features, structure, materials, or characteristics described in conjunction with the embodiment or example are included in at least one embodiment or example of the present disclosure. In this specification, the schematic representations of the above terms do not necessarily refer to the same embodiment or example. Moreover, the described specific features, structures, materials or characteristics may be combined in any one or more embodiments or examples in a suitable manner. In addition, those skilled in the art can combine the different embodiments or examples described in this specification.

Although the embodiments of the present disclosure have been shown and described above, it should be understood that the above-mentioned embodiments are exemplary and should not be construed as limiting the present disclosure. Those of ordinary skill in the art can make changes, modifications, substitutions and modifications to the above-mentioned embodiments within the scope of the present disclosure.

What is claimed is:

1. A solar photovoltaic panel assembly, comprising:
    a support frame having a primary photovoltaic panel mounting layer and a secondary photovoltaic panel sliding layer that are laminated to each other in a thickness direction of the support frame;
    a primary photovoltaic panel mounted on the primary photovoltaic panel mounting layer;
    a secondary photovoltaic panel slidably movable along the secondary photovoltaic panel sliding layer to a storage position at which the secondary photovoltaic panel has a maximum overlapping area with the primary photovoltaic panel in the thickness direction of the support frame and an expansion position at which the secondary photovoltaic panel slidably moves outwards relative to the primary photovoltaic panel; and
    a cylindrical and telescoping driving member mounted on the support frame and configured to drive the secondary photovoltaic panel to slide along the secondary photovoltaic panel sliding layer,
    wherein each of the secondary photovoltaic panel has a support rod located in a middle of the secondary photovoltaic panel and fixedly oriented in a sliding-out direction of the secondary photovoltaic panel; and
    wherein the driving member has an end connected to the support frame and another end hinged to the support rod.

2. The solar photovoltaic panel assembly according to claim 1, wherein the support frame is constructed as a hollow frame structure.

3. The solar photovoltaic panel assembly according to claim 1, wherein the secondary photovoltaic panel sliding layer comprises a secondary photovoltaic panel sliding layer provided and located on a side of the primary photovoltaic panel mounting layer facing towards a vehicle body of a vehicle.

4. The solar photovoltaic panel assembly according to claim 1, wherein the driving member is in a form of an electrical retractable rod and comprises:
    a driving element comprising a base hinged to the support frame; and
    a retractable rod having one end located in the driving element and another end hinged to the secondary photovoltaic panel, the driving element being configured to drive the retractable rod to extend or retract relative to the driving element.

5. The solar photovoltaic panel assembly according to claim 4, wherein:
    a base bracket is disposed on the support frame, the base being hinged to the base bracket by a base hinge pin; and
    a rod support is disposed on the secondary photovoltaic panel, the retractable rod being hinged to the rod support by a rod hinge pin.

6. The solar photovoltaic panel assembly according to claim 1, wherein the driving member is of a rod-shaped structure, and a length extending direction of the driving member intersects with or is parallel to a sliding-out direction of the secondary photovoltaic panel.

7. The solar photovoltaic panel assembly according to claim 6, wherein an angle between the length extending direction of the driving member and the sliding-out direction of the secondary photovoltaic panel ranges from 30° to 60°.

8. The solar photovoltaic panel assembly according to claim 4, wherein the driving member further comprises:
    a first limiting switch configured to limit an ultimate extending position of the retractable rod extending from the driving element; and
    a second limiting switch configured to limit an ultimate retraction position of the retractable rod retracting towards the driving element.

9. The solar photovoltaic panel assembly according to claim 4, wherein the driving member further comprises a control unit, the control unit being a remote-control unit and configured to drive the retractable rod to extend or retract.

10. The solar photovoltaic panel assembly according to claim 1, wherein the primary photovoltaic panel mounting layer comprises:
    a lower bracket having a lower supporting surface; and
    an upper pressing member having an upper pressing surface, wherein:
    the lower supporting surface is located on a side of the upper pressing surface facing towards a vehicle body of a vehicle;
    a primary photovoltaic panel mounting space is defined between the lower supporting surface and the upper pressing surface;
    a bottom surface of the primary photovoltaic panel is supported by the lower supporting surface; and
    the upper pressing surface is pressed against a top surface of the primary photovoltaic panel.

11. The solar photovoltaic panel assembly according to claim 1, wherein:
    sliding rails are disposed on the secondary photovoltaic panel sliding layer and arranged opposite to each other; and
    the secondary photovoltaic panel is configured to be slidably engaged with the sliding rails.

12. The solar photovoltaic panel assembly according to claim 11, wherein the support frame is a rectangular frame and comprises short side frames opposite to each other and long side frames connected to the short side frames, a length of each of the short side frames being smaller than a length of each of the long side frames, and the sliding rails being arranged on the short side frames opposite to each other, respectively.

13. The solar photovoltaic panel assembly according to claim 1, wherein a vehicle body connection portion is disposed on the support frame and configured to be connected to a vehicle body of a vehicle.

14. The solar photovoltaic panel assembly according to claim 13, wherein the vehicle body connection portion is of a form of a fixed wing, and comprises:
    a first wing plate fixed on the support frame; and a second wing plate connected to the first wing plate, the second wing plate and the vehicle body of the vehicle being connected to each other through bonding and/or by means of a fastener.

15. The solar photovoltaic panel assembly according to claim 13, wherein the primary photovoltaic panel and the secondary photovoltaic panel have a same structure and each comprise a photovoltaic panel frame and a photovoltaic panel body, the photovoltaic panel frame being constructed as a hollow frame-type structure circumferentially closed, and the photovoltaic panel body being mounted within a space circumferentially enclosed by the photovoltaic panel frame.

16. The solar photovoltaic panel assembly according to claim 15, wherein:
the support frame is an aluminum profile frame;
the photovoltaic panel frame is an aluminum alloy frame; and
the vehicle body connection portion is an aluminum alloy wing.

17. A vehicle, comprising:
a vehicle body; and
a solar photovoltaic panel assembly comprising:
a support frame having a primary photovoltaic panel mounting layer and a secondary photovoltaic panel sliding layer that are laminated to each other in a thickness direction of the support frame;
a primary photovoltaic panel mounted on the primary photovoltaic panel mounting layer;
a secondary photovoltaic panel slidably movable along the secondary photovoltaic panel sliding layer to a storage position at which the secondary photovoltaic panel has a maximum overlapping area with the primary photovoltaic panel in the thickness direction of the support frame and an expansion position at which the secondary photovoltaic panel slidably moves outwards relative to the primary photovoltaic panel; and
a cylindrical and telescoping driving member mounted on the support frame and configured to drive the secondary photovoltaic panel to slide along the secondary photovoltaic panel sliding layer, wherein:
the solar photovoltaic panel assembly is located on a roof of the vehicle body; and
the support frame is fixed to the vehicle body,
wherein each of the secondary photovoltaic panel has a support rod located in a middle of the secondary photovoltaic panel and fixedly oriented in a sliding-out direction of the secondary photovoltaic panel; and
wherein the driving member has an end connected to the support frame and another end hinged to the support rod.

18. The vehicle according to claim 17, wherein the support frame is constructed as a hollow frame structure.

19. The vehicle according to claim 17, wherein the secondary photovoltaic panel sliding layer comprises a secondary photovoltaic panel sliding layer provided and located on a side of the primary photovoltaic panel mounting layer facing towards a vehicle body of the vehicle.

20. The vehicle according to claim 17, wherein:
the roof of the vehicle body comprises a transverse edge extending in a left-and-right direction of the vehicle, and a longitudinal edge extending in a forward-and-backward direction of the vehicle; and
the support frame is a rectangular frame, and comprises short side frames opposite to each other and long side frames connected to the short side frames, a length of each of the long side frames being 0.8 times to 1 times a length of the transverse edge.

* * * * *